United States Patent [19]
Patient

[11] Patent Number: 4,516,607
[45] Date of Patent: May 14, 1985

[54] FAUCET MIXER

[75] Inventor: Lucien Patient, Montrouge, France

[73] Assignee: Les Robinets Presto, Montrouge, France

[21] Appl. No.: 199,668

[22] Filed: Oct. 22, 1980

Related U.S. Application Data

[63] Continuation of Ser. No. 960,551, Nov. 14, 1978, abandoned.

[30] Foreign Application Priority Data

Nov. 23, 1977 [FR] France ............................ 77 35147

[51] Int. Cl.³ ............................................. F16K 11/10
[52] U.S. Cl. .................................. 137/637.4; 137/637.3; 251/44
[58] Field of Search ............... 137/637.3, 637.4, 636.4; 251/44, 40, 33

[56] References Cited

U.S. PATENT DOCUMENTS

| | | | |
|---|---|---|---|
| 1,511,009 | 10/1924 | Spear | 251/43 |
| 1,517,990 | 12/1924 | Hinkle . | |
| 2,596,464 | 5/1952 | Bauberger . | |
| 2,722,236 | 11/1955 | Zee . | |
| 2,847,031 | 8/1958 | Brown, Jr. | 137/637.4 |
| 2,988,110 | 6/1961 | Thomas | 137/636.4 |
| 3,472,484 | 10/1969 | Parker | 251/174 |
| 3,645,297 | 2/1972 | Boultinghouse | 137/637.3 |
| 3,788,601 | 1/1974 | Schmitt | 251/304 |
| 3,860,073 | 1/1975 | Willms | 251/43 |

FOREIGN PATENT DOCUMENTS

| | | |
|---|---|---|
| 475993 | 6/1915 | France . |
| 545077 | 10/1922 | France . |
| 897718 | 3/1945 | France . |
| 1208099 | 2/1960 | France . |
| 1048375 | 11/1966 | United Kingdom . |

Primary Examiner—A. Michael Chambers
Attorney, Agent, or Firm—Sandler & Greenblum

[57] ABSTRACT

A faucet mixer for mixing at least two fluids comprising a mixing chamber, at least two feed lines adapted to open into a mixing chamber and a cock shell adapted to block each of the pipes as a function of its position. The cock shell is arranged within the mixing chamber and comprises a cylinder, and a flap valve adapted to close the cylinder to prevent either of the fluids from passing through the cylinder. The flap valve is adapted to seat at one end of the cylinder.

1 Claim, 7 Drawing Figures

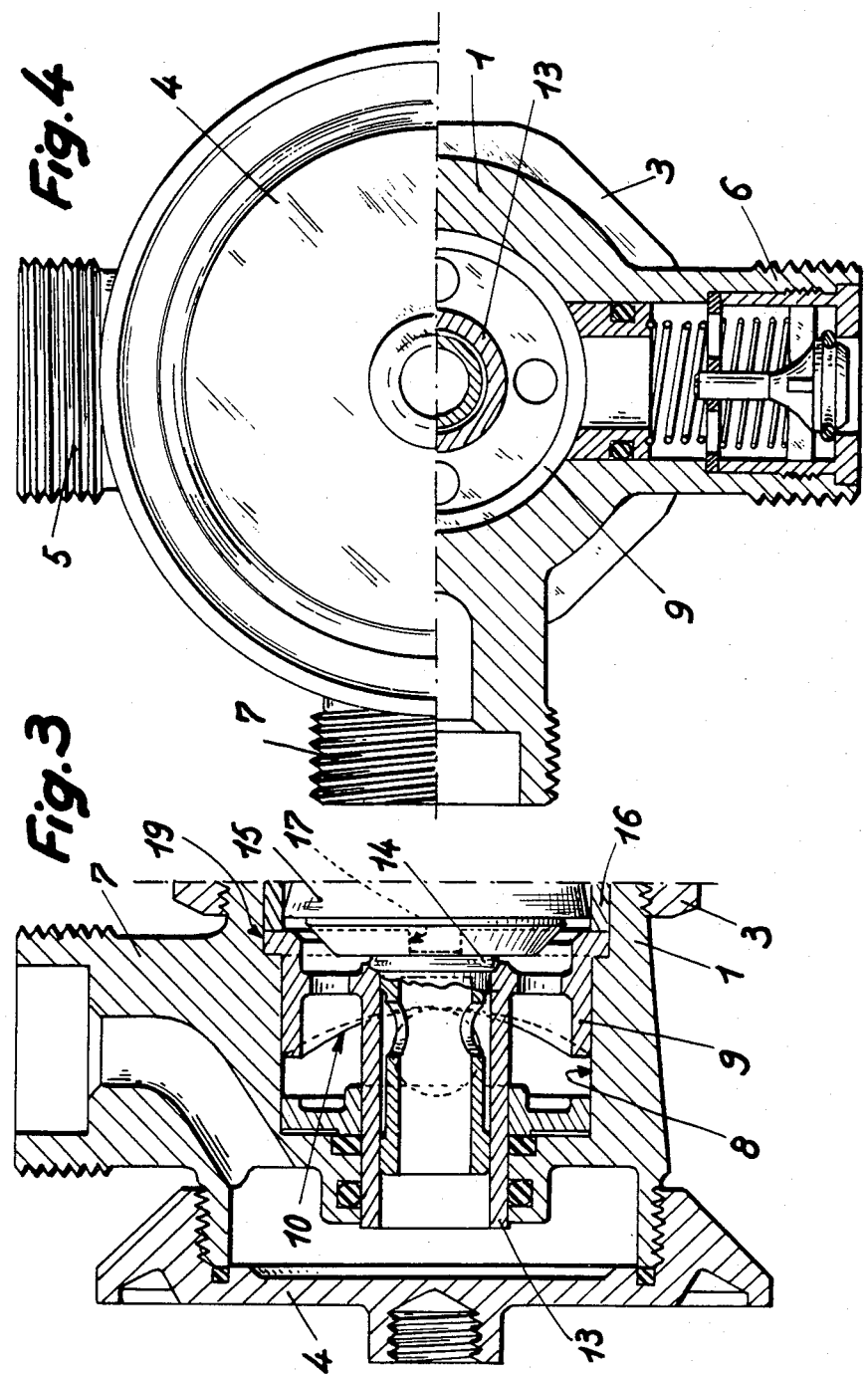

4,516,607

FAUCET MIXER

This application is a continuation of application Ser. No. 960,551, filed Nov. 14, 1978, now abandoned.

BACKGROUND OF THE INVENTION

1. Field of the Invention

The invention relates to improvements in faucet mixers and, more particularly, to timed closure faucet mixers.

2. Description of the Prior Art

Normally, when one desires to mix hot and cold water each of the two lines is fed into a mixing chamber which comprises a device making it possible to block each of the lines to a greater or lesser extent.

Although the flow through a single pipe or line may be regulated by means of a cock shell and although such a technique may be very simple, such a device does not provide an effective water seal. Furthermore, a device of this type cannot normally be used in conjunction with a faucet mixer. In effect, because of the clearances necessarily existing between the external periphery of the cylindrical cock shell and its cylinder into which each of the two pipes feed, the water of one of the pipes will infiltrate through the clearance and will mix prematurely with that of the other pipe.

Thus, with such a system it will not be possible to obtain untempered cold water by virtue of leaks from the hot water pipe through the above cited clearance.

SUMMARY OF THE INVENTION

It is, therefore, an object of the invention to remedy the above inconveniences.

It is yet another object of the invention to provide means for effectively sealing a faucet mixer used in conjunction with a timing device by rotation of a cock shell.

BRIEF DESCRIPTION OF THE DRAWINGS

With reference to the annexed drawings which illustrate the invention by way of example:

FIG. 3 is a partial cross-sectional view along the line III—III of FIG. 1;

FIG. 4 is a view of the bottom half of the device, cut away, along IV—IV of FIG. 1;

DESCRIPTION OF PREFERRED EMBODIMENTS

According to the invention bored bushings are permanently axially applied against the exterior periphery of the cock shell so that it forms a mating relationship with it so as to minimize leaks. The bushings are arranged at the ends of each of the pipes feeding the fluids to the mixing chamber such that they are between the pipe and the cock shell.

Yet a further aspect of the invention comprises using one of the elements of the timing device to rotate the cock shell so as to effect mixture of the two fluids.

Although the term fluid is used throughout the specification, the invention has particular application with respect to liquids such as hot and cold water although other fluids may likewise be used.

Figure 1:
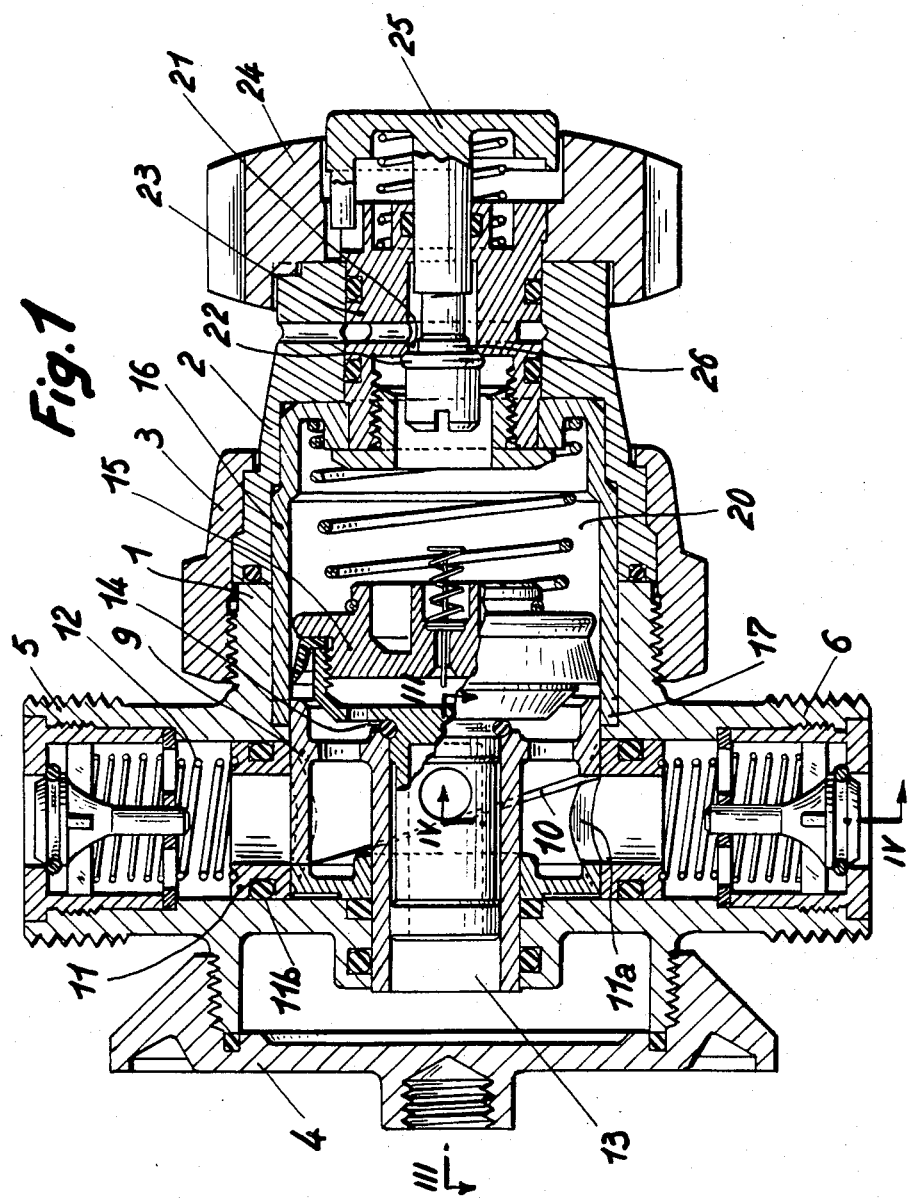
FIG. 1 is a cross-sectional view of the faucet in a closed position.

Referring to FIG. 1, it is seen that the faucet comprises a body portion having two parts, 1 and 2, assembled by means of a nut 3 so that the device may be mounted on a wall on a mounting base 4. Parts 1 and 2 house at least one of the movable elements of the faucet, which include a cock shell 9, cylinder 16, valve stem 23 and auxiliary valve 22.

Part 1 is provided with two feed openings or pipes 5 and 6 for hot and cold water respectively, as well as an outlet opening 7 for the mixed water (see FIGS. 3 and 4).

Lines 5 and 6 feed into a cylindrical bore 8 of the part 1 (FIG. 3) in which a cylindrical cock shell 9 having an oblique slit 10 is rotatably arranged. Cock shell 9 is preferably made in two sections and the slit has the shape shown in the drawings (see FIG. 5).

Figure 2:
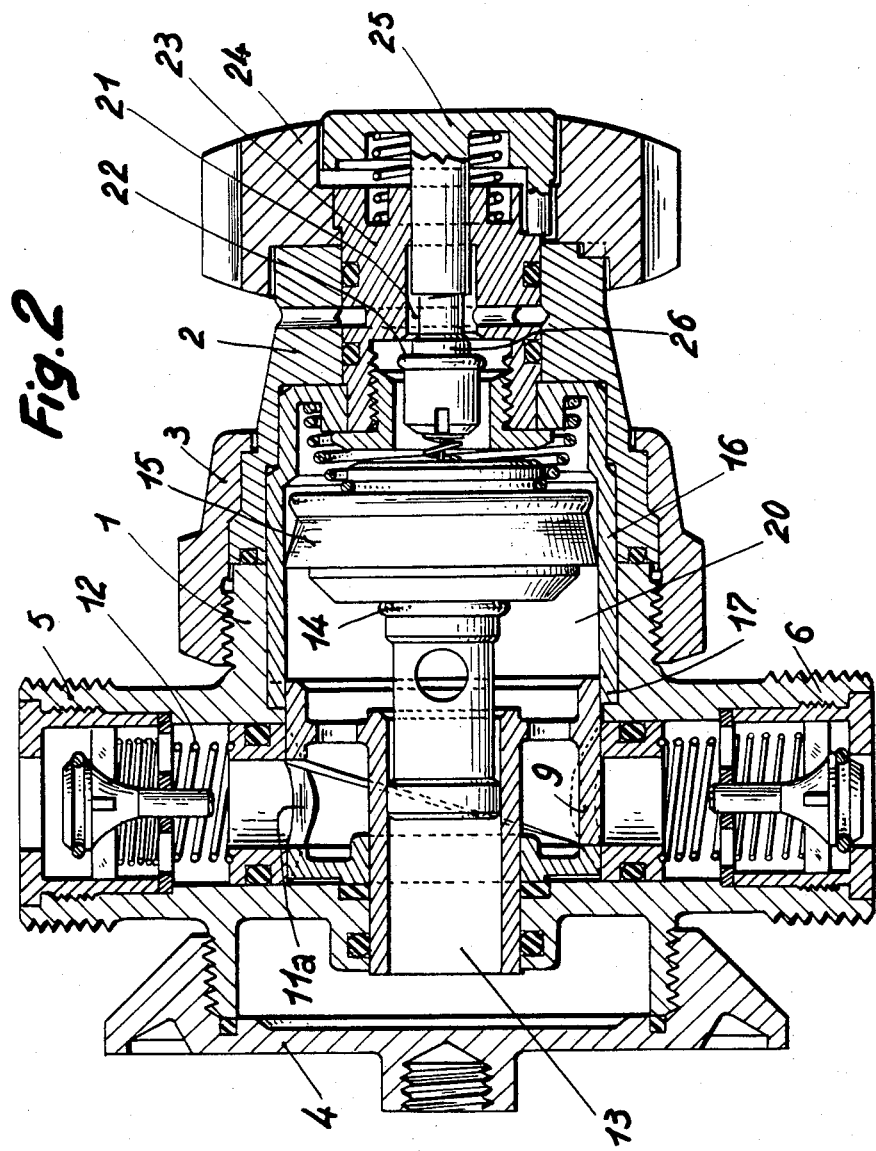
FIG. 2 is a view analagous to that of FIG. 1, with the faucet in the open position and the cock shell for regulating the mixture being rotated by 180°.

As may be seen from FIGS. 1 and 2, by rotation of the cock shell 9 by 180° it is possible to block one or the other of the feed lines 5 and 6 or to obtain any degree of mixture desired.

With the device of the invention when the cock shell is in the position shown in FIG. 1, for example, infiltration of water between the external periphery of the cock shell 9 and the bore 8 is stopped. Were this infiltration to occur, the water would penetrate through the slit 10 into the mixing chamber arranged in the interior portion of the cock shell.

According to the invention leakage is prevented by means of bushings 11 which have an axial bore and which are applied under pressure against the periphery of the cock shell 9. The end or portion of the bushing in contact with the cock shell closely mates with the periphery or profile of the latter thus preventing leakage.

In the embodiment illustrated, the end 11a of each of the bushings is in contact with the cock shell and has a cylindrical-concave surface which is applied against the periphery of the cock shell by means of a spring 12.

A seal is maintained between each bushing and the internal bore of the feed pipes 5 and 6, for example, by means of a torus joint 11b. In this way, the cock shell 9 is freely engaged within the bore 8.

According to yet another aspect of the invention, the cock shell 9 is provided with a first tubular cylinder 13 normally blocked by means of a flap valve 14. When the flap valve is raised, tempered water or other fluid flows through the first cylinder 13 and is evacuated through the opening 7 (FIG. 3).

Figure 5:
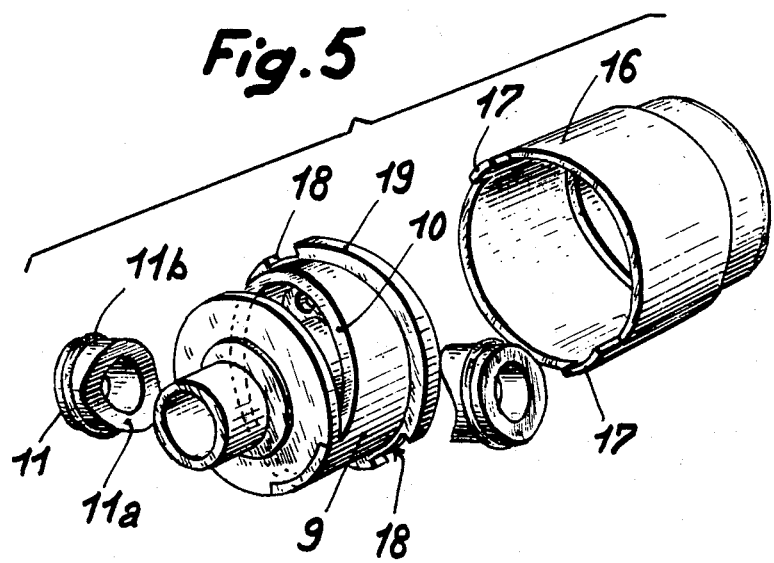
FIG. 5 is a magnified perspective view of the bushings and cock shell.

As part of another aspect of the invention, the flap valve 14 is supported by means of a moveable or reciprocable piston 15 in the second cylinder 16 which is rotatably connected to the cock shell 9. In one embodiment of the invention, the cylinder 16 is provided with two fingers 17 adapted to engage themselves in two corresponding slits 18 of the collar 19 of the cock shell 9 (FIG. 5).

Cylinder 16 is comprised of a conventional timing mechanism whose timing chamber 20 is adapted to communicate with the exterior by means of orifice 21 which is normally blocked by means of auxiliary flap valve 22. Timing chamber 20 is also in communication with cylinder 13 via an opening in the center of piston 15.

A spring, as seen in FIG. 1, is attached to one end of piston 15 in chamber 20 to bias piston 15 toward cock shell 9, in addition to fluid pressure in chamber 20. Line pressure on the other side of piston 15 biases piston 15 away from cock shell 9. When fluid is evacuated from chamber 20, through orifice 21, line pressure moves piston 15 and valve 14 to the right as seen in FIG. 2 to unblock the flow of fluid in cylinder 13. When orifice 21 is closed by valve 22 fluid again fills chamber 20 from cylinder 13 via the central opening in piston 15. The fluid in chamber 20 along with the spring attached to piston 15 counteract the line pressure and move piston 15 toward cock shell 9. As a result valve 14 is seated in cylinder 13 to block fluid flow out of cylinder 13.

The cylinder 16 is coupled to a valve stem 23 supporting a flap valve 22 and traverses the part 2 of the body portion in which it is arranged to pivot.

A valve stem 23 is coupled to a knob 24 comprising a push button control 25 at its center coupled to the shaft 26 of the auxiliary flap valve 22.

The extent of rotation of the knob 24 determines the extent of rotation of the timing device and, as a result, the position of the cock shell 9.

Figure 6:
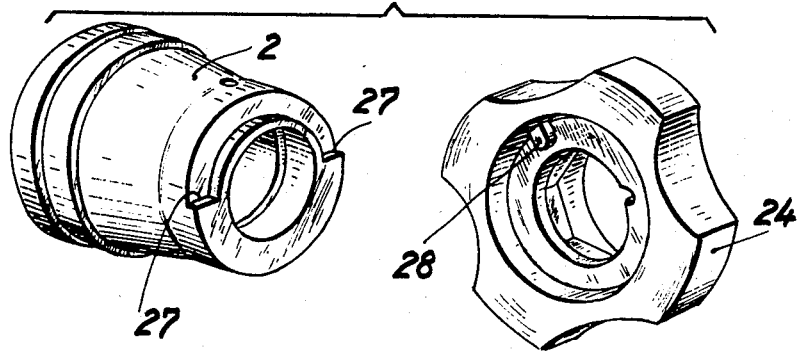
FIG. 6 is a magnified perspective view of the knob and body of the device.
Figure 7:
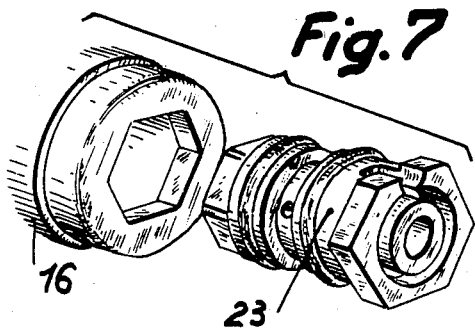
FIG. 7 is a magnified perspective view of the second cylinder.

The knob 24 is limited to a rotation of 180°. The extent of rotation is limited, for example, by providing two shoulders 27 diametrically opposite one another on the part 2 (see FIG. 6) as well as a finger or protrusion 28 on the knob 24 which serves to limit rotation.

In operation, the device is initially in the position shown in FIG. 1 with the piston 15 seated such that the flap valve is closed thus preventing entry of water into first cylinder 13. After the device has been adjusted by means of rotating knob 24 to achieve the proper mix of fluid desired, the user presses control push button 25 which unseats auxiliary flap valve 22 thus permitting fluid to escape from the device. As a result of the inequality of pressure resulting on both sides of piston 15, the piston moves within the second cylinder 16 to the position shown in FIG. 2. Upon release of the control push button 25 the auxiliary flap valve once again is seated and pressure is equalized on both sides of the piston 15 which then moves back to its seated position by virtue of the pressure exerted by the spring.

Although the invention has been described with respect to particular elements and embodiments, it is to be understood that the invention is not limited to these embodiments and is to be construed only as limited by the scope of the claims.

What is claimed is:

1. A faucet comprising a body comprising:
   (a) a first body part adapted to be releasably attached to a second body part, wherein said first body part comprises:
     (i) means for mounting said first body part on a mounting base on a wall at one end thereof;
     (ii) two feed openings comprising means for receiving hot and cold water pipes, respectively, on opposite sides of said first body part;
     (iii) an outlet for water from said hot and cold water pipes;
     (iv) a cylindrical bore positioned between said feed openings at an anterior end of said first body part, comprising means for receiving water from said hot and cold water pipes;
     (v) a cylindrical cock shell having an oblique opening therein and adapted to rotate in said bore, wherein said cock shell comprises means for producing any desired mix of hot and cold water in said cylindrical bore;
     (vi) a first cylinder, attached to said cock shell, one end of which communicates with said two feed openings, the other end of which communicates with said outlet;
     (vii) a valve, adapted to reciprocate in said cock shell cylinder, into an open and a closed position, wherein in said open position said valve permits fluid to flow from said two feed openings into said first cylinder and to said outlet, and in said closed position said valve blocks fluid flow from said two feed openings to said first cylinder;
     (viii) a second cylinder, an anterior end of which is positioned in and adapted to rotate in said first body part of said body, and a posterior end of which is positioned in and adapted to rotate in said second body part of said body, wherein said second cylinder, at said anterior end thereof comprises means for attachment to one end of said cock shell so that rotation of said second cylinder rotates said cock shell, wherein said second cylinder, at the posterior and the anterior end thereof comprises an opening, and wherein said second cylinder further comprises a piston and having an opening in the center thereof, communicating with said second cylinder and said cock shell, and a spring adapted to bias a posterior end of said piston toward said cock shell, wherein said piston is attached at its anterior end to said valve; and wherein said body further comprises:
   (b) a second body part, comprising:
     (i) an auxiliary valve stem, attached to the posterior end of said second body part and adapted to rotate therein, wherein said valve stem is attached to the posterior end of said second cylinder such that rotation of said valve stem rotates said second cylinder;
     (ii) a knob, attached to said valve stem and attached to said posterior end of said second body part, wherein said knob is adapted to rotate on said second body part, thereby rotating said valve stem;
     (iii) a push button, adapted to reciprocate in said knob;
     (iv) an auxiliary valve having a shaft at a posterior end thereof, attached to said push button, wherein said auxiliary valve is seated in said auxiliary valve stem and is adapted to reciprocate into a closed position in which said opening in the posterior end of said second cylinder is blocked, and is adapted to reciprocate into an open position in which said opening in the posterior end of said second cylinder is unblocked to permit fluid to flow therethrough; and
     (v) elastic means attached to said shaft for biasing said auxiliary valve closed.

* * * * *